United States Patent [19]

Teague et al.

[11] Patent Number: 5,401,297
[45] Date of Patent: Mar. 28, 1995

[54] PROCESS FOR REMOVING CAPROLACTAM EMISSIONS BY A WASHING METHOD

[75] Inventors: Beth O. Teague, Asheville; Dennis G. Shealy, Fletcher; William C. Hiatt, Hendersonville, all of N.C.

[73] Assignee: BASF Corporation, Parsippany, N.J.

[21] Appl. No.: 130,044

[22] Filed: Sep. 30, 1993

[51] Int. Cl.6 .............................................. B01D 47/00
[52] U.S. Cl. ................................. 95/187; 95/199; 95/200; 95/212; 95/214; 95/239; 264/169
[58] Field of Search ............... 55/223, 233, 242, 244, 55/248, 250, 252, 255, 256, 259, 338, 431, 467, 526, 528; 95/8, 149, 187, 199, 200, 210, 211, 212, 214, 224, 237, 239, 281; 264/169, DIG. 56

[56] References Cited

U.S. PATENT DOCUMENTS

| | | | |
|---|---|---|---|
| 2,952,675 | 9/1960 | Bolle | 95/187 |
| 3,047,565 | 7/1962 | Braun et al. | 95/187 |
| 3,763,631 | 10/1973 | Horn et al. | 95/281 |
| 4,120,671 | 10/1978 | Steinmeyer | 95/281 |
| 4,290,783 | 9/1981 | Adams et al. | 95/214 |
| 5,122,321 | 6/1992 | Chambers | 264/169 |
| 5,219,585 | 6/1993 | Shealy | 95/149 |

Primary Examiner—Charles S. Bushey
Attorney, Agent, or Firm—Nixon & Vanderhye

[57] ABSTRACT

Disclosed is a process for removing emissions from caprolactam polymerization operations and thermoplastic polycaprolactam processing operations by collecting air containing the emissions, directing the air, containing the emissions, to a candle filter in a candle filter housing and rinsing the air, containing the emissions, within the candle filter with an aqueous caprolactam solution, containing at least 4% by weight caprolactam.

13 Claims, 3 Drawing Sheets

PROCESS FOR REMOVING CAPROLACTAM EMISSIONS BY A WASHING METHOD

FIELD OF THE INVENTION

The present invention relates generally to a process for removing caprolactam emissions from caprolactam polymerization operations and thermoplastic polycaprolactam processing operations. More specifically, it relates to removing emissions before, during and after the polymerization reaction for the manufacture of polycaprolactam and during thermoplastic polycaprolactam processing operations like extrusion, injection molding and fiber spinning operations.

BACKGROUND OF THE INVENTION

During the manufacture of polycaprolactam and polycaprolactam articles, recycling of polycaprolactam articles and cleaning operations of reactors and processing machinery, caprolactam emissions may be released to the environment, which is not desirable. For example, before, during and after the polymerization of epsilon-caprolactam, hereinafter referred to as caprolactam, monomer vapors may be released in the environment from transportation tanks, storage tanks, pipelines, ducts, polymerization reactors, polymer melts, polymer strands, water bath, cutters, dryers and the like. During thermoplastic polycaprolactam processing like injection molding or extrusion the thermoplastic polymers are for example extruded through an extruder into strands for chip production or into films, fibers, profiles, tubes and the like. During the extrusion at a temperature of from about 180° to about 350° C., monomer or oligomer caprolactam vapors, compounds formed by thermal evaporation, thermal decomposition, or vapors of additives are released from the surface of the extruded polymers, which are leaving the nozzle of the extruder. These vapors evaporate immediately into an aerosol that would form deposits in the neighborhood of the extruder and therefore must be removed, which is usually done by the quench air removal. The exhaust air is usually released into the environment, which is not desirable.

A filament quenching apparatus is known from U.S. Pat. No. 3,619,452 which comprises a quenching chamber and a gas entry chamber. The quench air exits the quenching apparatus without further treatment.

U.S. Pat. No. 4,676,807 discloses a process for removal of liquid aerosols from gaseous streams by passing the stream through a coalescing filter. In the examples oil and water aerosols were tested.

U.S. Pat. No. 4,759,782 which is a C.I.P. of an application which issued as U.S. Pat. No. 4,676,807 described above, discloses the coalescing filter for removal of liquid aerosols from gaseous streams.

U.S. Pat No. 4,464,266 discloses a process for removing caprolactam and its oligomers from cooling water in order to prevent algal growth by introducing gases into the cooling water and separating off the formed foam. Other procedures for preventing algal growth were the addition of colloidal silver, ozonization of water and addition of formaldehyde, all of which may damage the nylon 6.

U.S. Pat. No. 5,219,585 discloses a monomer exhaust system for exhausting fumes released from a melt spinning process which has a housing, a nozzle for the collection of the fumes, a duct, a drawing force for moving the fumes and rinsing means for automatically purging said exhaust system of condensed fume deposits.

An object of the present invention was to provide a process for removal of emissions from caprolactam polymerization operations and thermoplastic polycaprolactam processing operations, which overcomes the problem of biological growth in the removal system.

Another object was to remove emissions from polycaprolactam fiber spinning operations, which overcomes the problem of biological growth in the removal system.

SUMMARY OF THE INVENTION

The objects of the present invention could be achieved with a process for removing caprolactam emissions, which comprises:
  (a) collecting air, containing the emissions;
  (b) directing at least a portion of the air, containing the emissions, to a candle filter;
  (c) washing the air, containing the emissions, within the candle filter with caprolactam solution, containing at least 4% by weight caprolactam.

DESCRIPTION OF THE PREFERRED EMBODIMENTS

The process of the present invention is suitable for removing caprolactam emissions from a broad variety of emission sources during the manufacturing of polycaprolactam articles like polymerization, thermoplastic processing, cleaning operation or recycling operations.

Articles made from polycaprolactam are manufactured in several steps. One step is the polymerization of caprolactam to a polycaprolactam followed by the thermoplastic processing into the final shape of the article.

Figure 1:
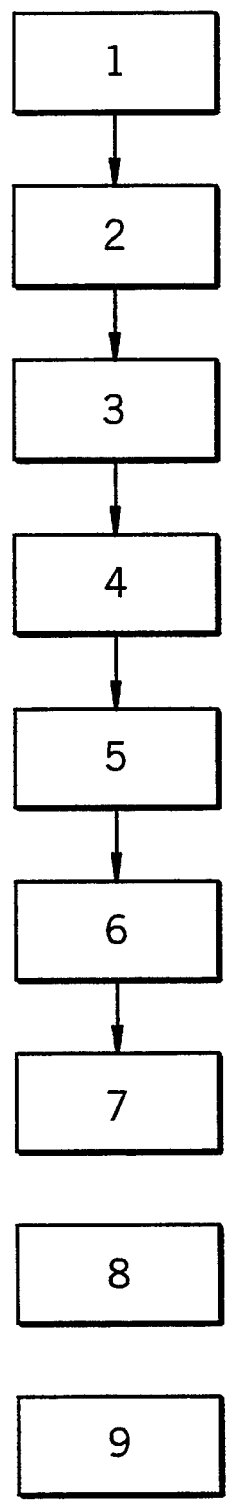
FIG. 1 is a flow chart of a caprolactam polymerization operation and a thermoplastic polycaprolactam processing operation.

FIG. 1 shows a general flow chart for the manufacture of such articles including a caprolactam polymerization operation comprising the feedstock transfer (1), the feedstock processing (2), the reactor (3) and the polycaprolactam processing (4) as well as a thermoplastic processing comprising the thermoplastic processing (5), conditioning (6) and the final polycaprolactam product (7). Also included in the operation is a cleaning operation (8) and a recycling operation (9).

The feedstock transfer (1) includes the monomer transport via pipeline, truck, rail, drum, sack and the like. The feedstock processing (2) comprises storage tanks, mixing and conditioning of monomers. The reactor (3) comprises the reaction chamber where the caprolactam polymerization reaction takes place and all the peripheral equipment like columns and pipes and additional feedstock equipment. After the polymerization is finished the polycaprolactam melt exits the reactor and is transformed into chips, flakes or granules in the polycaprolactam processing (4) which comprises pump blocks where the polycaprolactam melt is formed into polycaprolactam strands, a water bath for cooling the polycaprolactam strands, a cutter for cutting the polycaprolactam strands into chips and a dryer to dry the chips.

In the thermoplastic processing operation the thermoplastic polycaprolactam is melted, for example, in an extruder or injection molding machine which is shown as thermoplastic processing (5). The polycaprolactam exits the injection molding machine in form of a shaped article.

In the case of extrusion the polymer melt exits the extruder in form of strands, films, fibers, profiles, tubes and the like, which are conditioned in the conditioning (6), which includes the treatment with quench air, finish application, drawing, texturizing, heat setting and the like to form the final article (7). In all seven stages emissions may be released in the environment like monomers, oligomers, additives, solvents, decomposition products and the like. For example emissions of monomers may be released during feedstock transfer from pipelines, trucks, rails or drums from vents of storage tanks or reactors, during polymer processing, during thermoplastic processing from the exit of the extruder or injection molding machine, during conditioning of for example fibers with regard to quenching, finish application or heat setting.

Emissions may be released also in cleaning operations (8) of the equipment used in (1) to (7) and (9) and in recycling operations (9), where thermoplastic polycaprolactam is depolymerized into caprolactam, the caprolactam is recovered and again polymerized. The process of the present invention is applicable to all emission sources, originated in polymerization operations, thermoplastic processing operations, cleaning operations or recycling operations.

The following is a description of the process of the present invention applied to fiber spinning operation as one example of the above mentioned multiplicity of possibilities for emissions.

The process for removal of emissions from fiber spinning operations is described with reference to FIG. 2 and FIG. 3.

Figure 2:
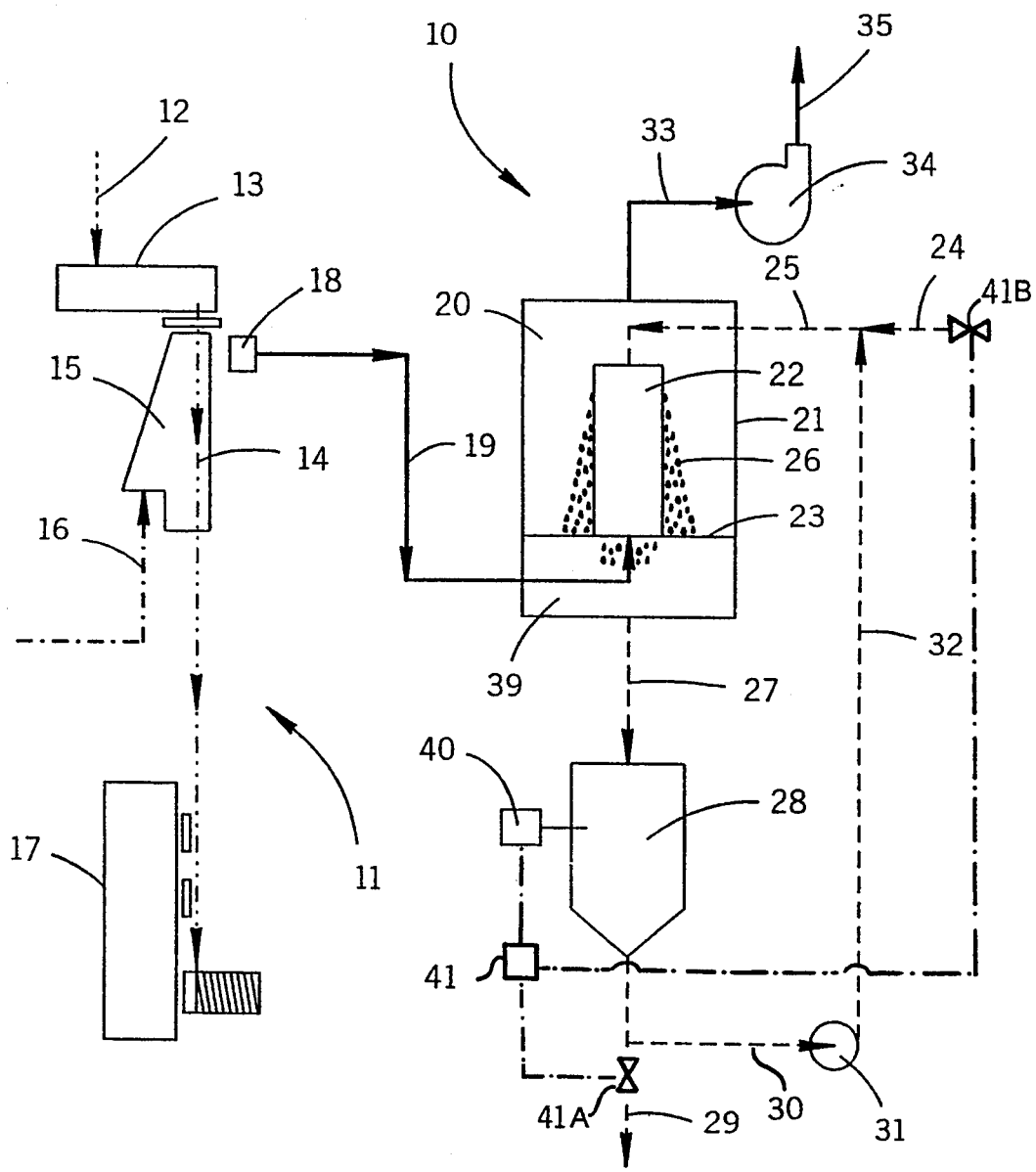
FIG. 2 is a schematic view of an apparatus for removing caprolactam emissions and a polycaprolactam fiber spinning operation.
Figure 3:
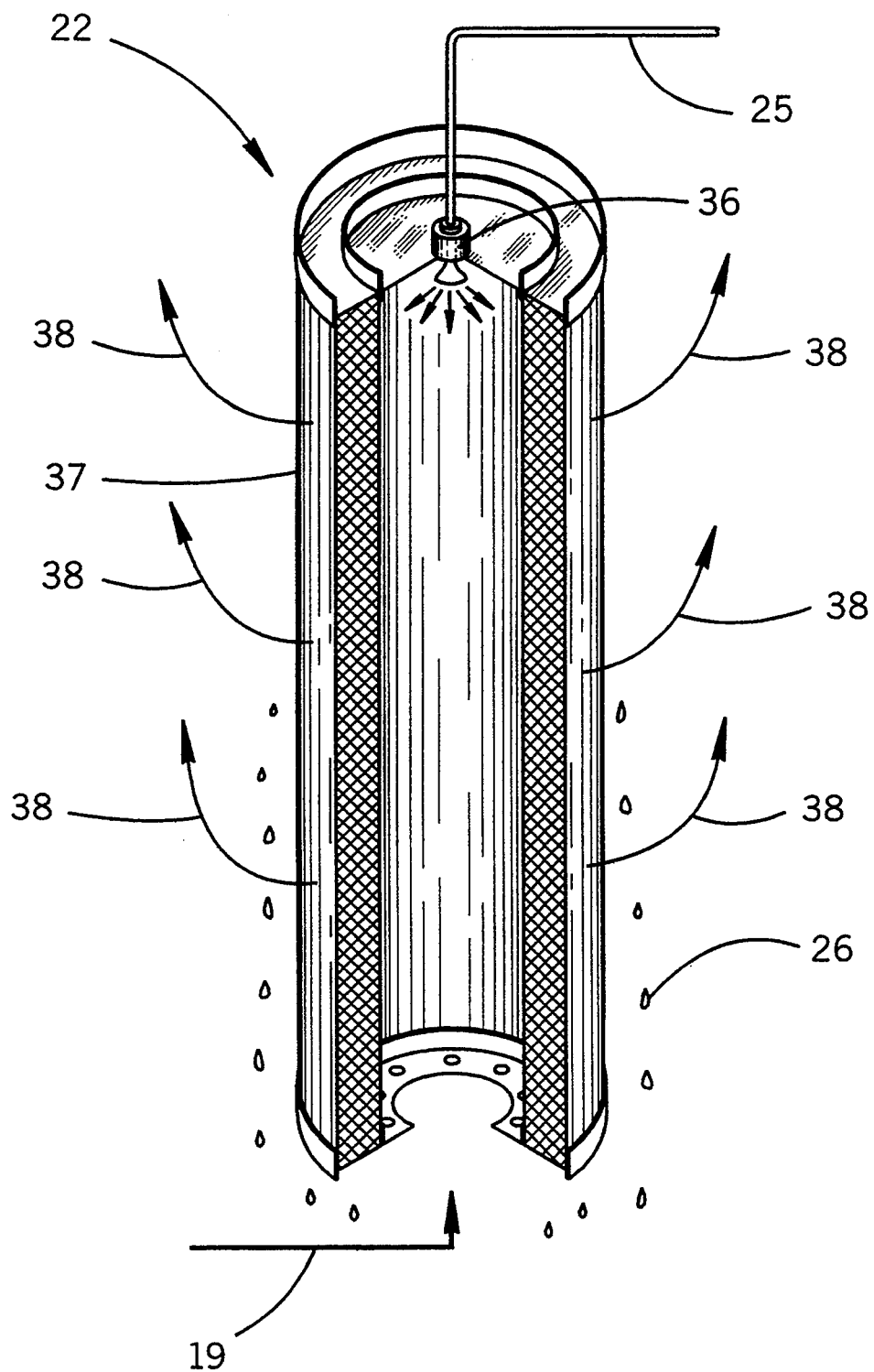
FIG. 3 is a side view of a candle filter.

FIG. 2 shows an apparatus for removing caprolactam emissions (10), together with a fiber spinning operation (11). In the fiber spinning operation (11) fiber forming polycaprolactam chips (12) are fed into the extruder (13) and spun into fibers (14) which are quenched in the quench cabinet (15) with quench air (16). The quenched fibers are optionally drawn and textured, which is not shown in FIG. 2 and wound on packages with the winding machine (17). The quench air (16) picks up and removes the emissions like monomers and oligomers, which evaporate from the hot surface of the fibers in the quench cabinet (15). From here the quench air containing the emissions is conducted through the header duct (18), the duct (19) and into the candle filter (22) of the candle filter housing (20). The candle filter housing (20) comprises the candle filter (22) which is located on a structural support (23). The candle filter (22) comprises according to FIG. 3 the filter encasing (37) and the nozzle (36). Demineralized or filtered water from the water supply (24) or an aqueous caprolactam solution from pipe (32), is conducted through the pipe (25) to the top or the bottom of candle filter (22), where it is sprayed preferably against, or with, the flow of the quench air containing the emissions and thereby washing out the emissions and leaving the candle filter (22) in form of the liquid (26) which is collected in the reservoir (28) over the pipe (27). The apparatus for removing caprolactam emissions (10) contains means (40) for maintaining the concentration of the aqueous caprolactam solution at a predetermined concentration of at least 4% by weight of caprolactam, preferably of at least 5% by weight and most preferred of at least 6% by weight which is preferably located at the reservoir (28). This means includes feedback equipment connected to the water supply (24) and to the drain (29) in order to add water to the tank and drain aqueous caprolactam solution through drain (29).

The washed quench air exits the candle filter (22) at (38), is conducted over the duct (33) and the exhaust fan (34) and is discharged over duct (35). The aqueous caprolactam solution containing the emissions is discharged from reservoir (28) over pipe (29) or recycled over pipe (30), water circulation pump (31), pipe (32) and (25) to the top, or bottom, of candle filter (22), where it is sprayed again over nozzle (36) against, or with, the flow of the quench air.

In an alternative the quench air may be washed with an aqueous caprolactam solution before entering the candle filter (22) in duct (19) before or in sump (39).

The apparatus for removing caprolactam emissions (10) preferably comprises a control system for maintaining the emission concentration in the reservoir (28) at a predetermined level. A suitable control system includes a refractometer (40) which is connected to the aqueous caprolactam solution and a feedback controller (41) which is connected operably to control valves (41A and 41B) located in the drain (29) and the water inlet (24), respectively. In the case where the refractometer determines an emission concentration which is above a predetermined level, solvent is drained by opening the valve (41A) of drain (29) and by adding new water through the water inlet (24) to the reservoir (28) by opening valve (41B) in the water inlet (24) until the desired concentration level is reached.

The process of the present invention is applicable to the polymerization and thermoplastic processing of polycaprolactam.

For the manufacture of fibers polycaprolactam hereinafter referred to as nylon 6 in fiber grade is suitable.

Suitable nylon 6 for the production of the fibers has a relative viscosity of from about 2.0 to about 3.2 preferably from about 2.2 to about 3.0 (measured in 90% formic acid at a concentration of 1.0% by weight) and is commercially available for example as Ultramid ® from BASF AG, Ludwigshafen, Germany.

The nylon 6 is fed into an extruder in form of chips or granules, melted and directed via jacketed Dowtherm ® (Dow Chemical, Midland Mich.) heated polymer distribution lines to the spinning head. The polymer melt is then metered by a high efficiency gear pump to spin pack assembly and extruded through a spinnerette. The nylon 6 fibers are spun at a temperature of from about 250° to 350° C. according to the respective polymer with a spinning speed of from about 1000 to about 5000 m/min, dependant on the type of product made.

In step (a) of the process of the present invention air containing the emissions is collected as follows: quench air (16) is supplied to the quench cabinet (15). Suitable quench cabinets are described for example in U.S. Pat. No. 3,619,452 the disclosure of which is herewith incorporated by reference. The quench air should be supplied as a nonturbulent stream to the melt extruded fibers, thereby cooling the fibers and picking up and removing the monomer and/or oligomer emissions in form of an aerosol. The face velocity of the quench air in header (18) is from about 12.0 to about 30.6 m/min, preferably from about 15.0 to about 30.6 m/min and most preferred from about 19.8 to about 22.8 m/s. The face velocity of the quench air varies according to mass flow and other process parameters.

In step (b) at least a portion of the air containing the emissions is directed to the candle filter housing (20) and through at least one candle filter (22). The candle filter housing (20) may contain 1, 2, 3 or more candle filters of a type candle filter (22). A suitable filter is described in U.S. Pat. No. 4,759,782, the disclosure thereof is herewith incorporated by reference. Suitable candle filters (22) comprise porous filter media. The filter may have constant pore size or tapered pore size and may be composite structures comprising multiple medium layers and/or multiple support layers. The pore size is in the range of from about 1 to 50 micrometers, preferably from about 4 to 30 micrometers and most preferred from about 5 to 20 micrometers.

Fibrous filter media may be made from organic or inorganic fibers or microfibers. Exemplary organic fibers include those made from polyolefins for example, polyethylene, polypropylene, polymethylpentane, polyisobutylene, and copolymers thereof, for example, ethylenepropylene; polyesters, for example, polybutylene terephthalate and polyethylene terephthalate and polyamides for example, polyhexamethylene adipamide (nylon 6/6), polyhexamethylene sebacamide (nylon 6/10), nylon 11 (prepared from 11-amino-nonanolic acid), and homopolymers of polyepsiloncaprolactam (nylon 6), and mixtures or blends of such polymers. The fibers may be made of other polymers which can be formed into fibers and mixtures of fibers also can be used.

Suitable inorganic fibers include those made from glass, metals or metal compounds like metal titanates, e.g., potassium titanate. Preferred for the present invention is glass.

The filter fibers generally will have diameters of from about 0.1 to about 20 micrometers. The filter fibers may vary in length from relatively short staple-like microfibers of about 12.7 mm or less up to substantially continuous filaments several feet or more in length. Typically, the median length to diameter ratio of the fibers will be in the range of from 500 to 1,000.

The thickness of the candle filter housing (37) comprising the filter media depends from the size of the whole candle filter and is from about 25.4 to about 127 mm, preferably from about 50.8 to about 76.2 mm.

A typical size of the filters to handle 56.6 m$^3$/min is 0.61 m in outside diameter by 3.05 m tall. An example of this filter is a KOCH Flexfiber Mist Eliminator Type BD-SRF-MKII 24120 constructed of special glass fiber and 316L stainless steel. The filter housing can be designed to have, for example 50% or 100% additional capacity for either lower pressure drops and higher efficiencies and the capability of bypassing one side of the house for maintenance. Such a design would include two independent houses welded together, each side capable of handling 100% or any range of the flow as long as the face velocity in the filters is less than or equal to 12.19 m/min.

A nozzle (36) is located at the top of the candle filter (22). A aqueous caprolactam solution is sprayed through the nozzle (36) with or preferably against the flow of the quench air in step (c). An optional nozzle is located in duct (19) in the sump (39) to aid in washing and saturating the air stream. The aqueous caprolactam solution is sprayed preferably countercurrent to the air flow and recycled by gravity into reservoir (28) over pipe (27).

Suitable nozzles are wide angle, non-clogging brass or stainless steel.

The aqueous caprolactam solution washes the emissions like monomers and/or oligomers of caprolactam out of the quench air and out of the filter media. It is rinsed through the candle filter (22).

The aqueous caprolactam solution containing the emissions is conducted from the outside and inside surface of the candle filter (22) and collected in the reservoir (28), from where it exits the system over duct (29) or is recycled through pipes (30), (32) and (25) by the solvent circulation pump (21).

A system utilizing aqueous caprolactam solution, (24) to clean the candle filter and/or to spray the inlet air stream (21) with emission laden polycaprolactam exiting over pipe (27) to pipe (29) is another option which avoids the use of a pump and reservoir.

The washed quench air exits the candle filter (22) at (38) and exits the candle filter housing (20) over the ducts (33), (35) and the exhaust fan (34). The removal rate of particles greater than 1 micron particles is very high, with removal of less than 1 micron particles being dependant on the face velocity in the candle filter. A face velocity in the candle filter of less than 12.19 m/min is recommended, and the efficiency of removal of submicron size particles is inversely proportional to the face velocity.

EXAMPLE 1

In a Nylon 6 fiber [Ultramid$^R$ B from BASF AG, Germany; RV=2.6 (1% solution in 90% formic acid at 25° C.)] production facility, was used to remove caprolactam emissions from the quench air. Approximately 2.83 m$^3$/min of caprolactam-laden quench air per quench box spinnerette, was removed from the quench box via a header duct, covering the top portion of the quench box, connected to a 0.076 m×0.051 m duct. The face velocity in the header duct was 91.44 m/min, while the velocity in the 0.076 m×0.051 m duct was 731.52 m/min. The temperature of the quench air entering the header duct was 37.78° C. The entire spinning row contained these header ducts and 0.076 m×0.051 m ducts which all connected into a main duct leading to the sump of the candle filter house. The velocity in the main duct was 1219.2 m/min. The emissions from a melt oven which removes caprolactam from the spinnerette packs via heat and from the spinnerette breakdown table were also directed to the candle filter house.

The duct entered the filter house which contained nine 0.61 m outside diameter (0.56 m inside diameter)×3.05 m candle filters, each capable of handling 56.63 m$^3$/min. The house had a fan on the discharge side. The house was designed for 0.51 m of water column static pressure. The sump served as an air inlet basin, as well as a reservoir for the caprolactam/water solvent. The duct entering the house contained 3 brass Spraying Systems Whirljet 9.53 mm Brass Wide Angle Small Capacity spray nozzles each capable of handling at least 1.14×10$^{-2}$ m$^3$/min each. Each candle filter contained 1 brass Spraying Systems Deflectojet 3.18 mm brass 120° Model 8686 spray nozzle capable of handling at least 3.79×10$^{-3}$ m$^3$/min each. Two stainless steel centrifugal pump were used to circulate the sump caprolactam/water solvent from the filter house sump basin to the filter spray and duct spray. The house contained a drain pipe in the sump for pump suction. A timer alternated the spraying of the filter and duct. A small amount of caprolactam/water solvent from each pump discharge was diverted to a single Critical Angle Refractometer by the Electron Machine Corporation Model MPR-83 for caprolactam concentration analysis and control. If the refractometer concentration was above 10% caprolactam by weight in water, then filtered water was added until the concentration was between 5% and 10%. The concentration of caprolactam was increased through cleaning of the caprolactam-laden candle filters for 15 minutes every 4 hours with the caprolactam/water solvent in the sump. The efficiency is rated for over 90% for this system. The opacity of the exhaust is transparent and, therefore, essentially zero.

EXAMPLE 2

A similar system was installed at a Nylon 6 [Ultramid$^R$ B from BASF AG, Germany; RV=2.6 (1% solution in 90% formic acid at 25° C.)] production facility in which 15 CECO filter candles were used to handle 25,000 cfm of caprolactam-laden exhaust from reactor vents and truck unloading hoods. Three separate filter houses, each containing 5 candles and capable of being shipped in one piece, were designed for this system. The filter houses were designed to handle 0.51 m of water column static pressure. Any two sides were handling 100% of the flow. Each of the two discharge fans were capable of handeling 100% of the flow as well. Either of two tanks, containing 5-7% caprolactam in water by weight and a backup tank containing distilled water, were used with either of two centrifugal pumps to spray the inlet air to the sump and the candles. The efficiency is rated for over 90% for this system. The opacity of the exhaust is transparent and, therefore, essentially zero.

We claim:

1. A process for removing caprolactam emissions, which comprises:
   (a) collecting air, containing the emissions;
   (b) directing at least a portion of the air, containing the emissions, to a candle filter; and
   (c) washing the air, containing the emissions, within the candle filter with an aqueous caprolactam solution, containing at least 4% by weight caprolactam.

2. The process according to claim 1, wherein step (a) includes the step of collecting air containing emissions which are released before, during and after a polymerization reaction.

3. The process according to claim 1, wherein step (a) includes the step of collecting air containing emissions which are released during thermoplastic polymer processing operations.

4. The process according to claim 1, wherein step (a) includes the step of collecting air containing emissions which are released during a thermoplastic processing operation which is selected from the group consisting of injection molding, extrusion, fiber spinning, blow molding and film blowing.

5. The process according to claim 1, wherein the aqueous caprolactam solution contains at least 5% by weight caprolactam.

6. The process according to claim 1, wherein the aqueous caprolactam solution contains at least 6% by weight caprolactam.

7. The process according to claim 1, wherein the aqueous caprolactam solution is recirculated and reused in step (c).

8. The process according to claim 1, further comprising washing the air before the candle filter.

9. A process for removing emissions from polycaprolactam fiber spinning operations, which comprises:
   (a) spinning polycaprolactam into fiber form within a quench cabinet;
   (b) introducing air into the quench cabinet so as to quench the polycaprolactam fiber and to entrain emissions therein;
   (c) collecting the air, containing the emissions, from the quench cabinet;
   (d) directing at least a portion of the emissions-containing air collected according to step (c) to a candle filter; and
   (e) washing the emissions-containing air collected according to step (c) with an aqueous caprolactam solution containing at least 4% by weight caprolactam.

10. The process according to claim 9, wherein the aqueous caprolactam solution contains at least 5% by weight caprolactam.

11. The process according to claim 9, wherein the aqueous caprolactam solution contains at least 6% by weight caprolactam.

12. The process according to claim 9, wherein the aqueous caprolactam solution is recirculated and used in step (e).

13. The process according to claim 9, further comprising washing the air before the candle filter.

* * * * *